H. LA CASSE.
MIXING MACHINE.
APPLICATION FILED MAY 27, 1915.
1,173,358.
Patented Feb. 29, 1916.
2 SHEETS—SHEET 2.
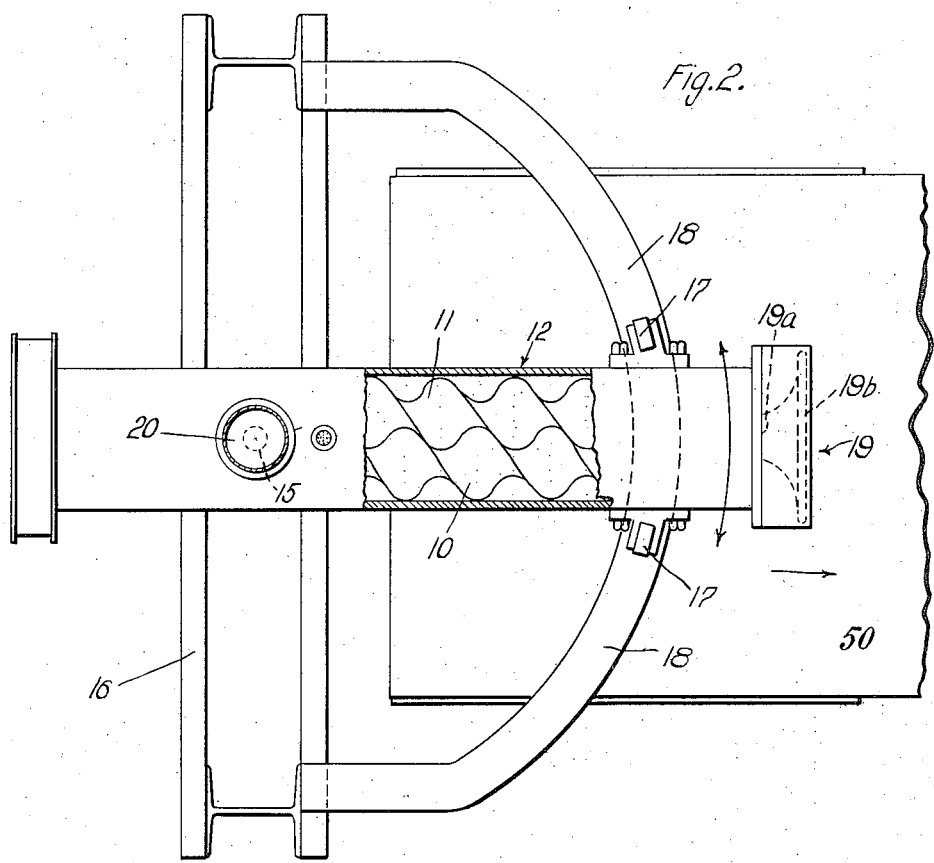
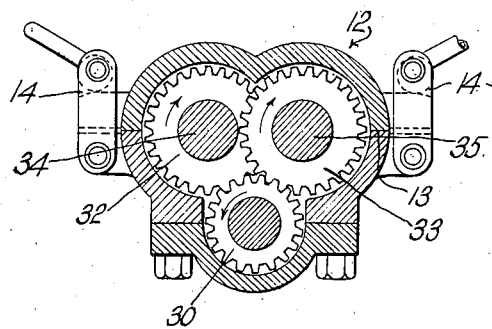
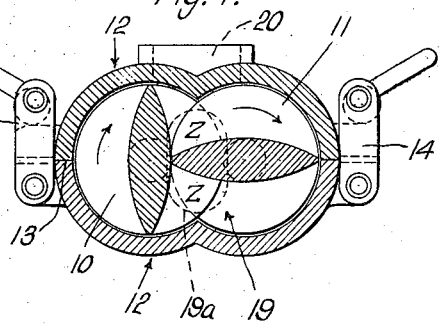
Witness
Elwood H Barkalow
Inventor
Henry La Casse
by James T Barkelew
his Attorney.

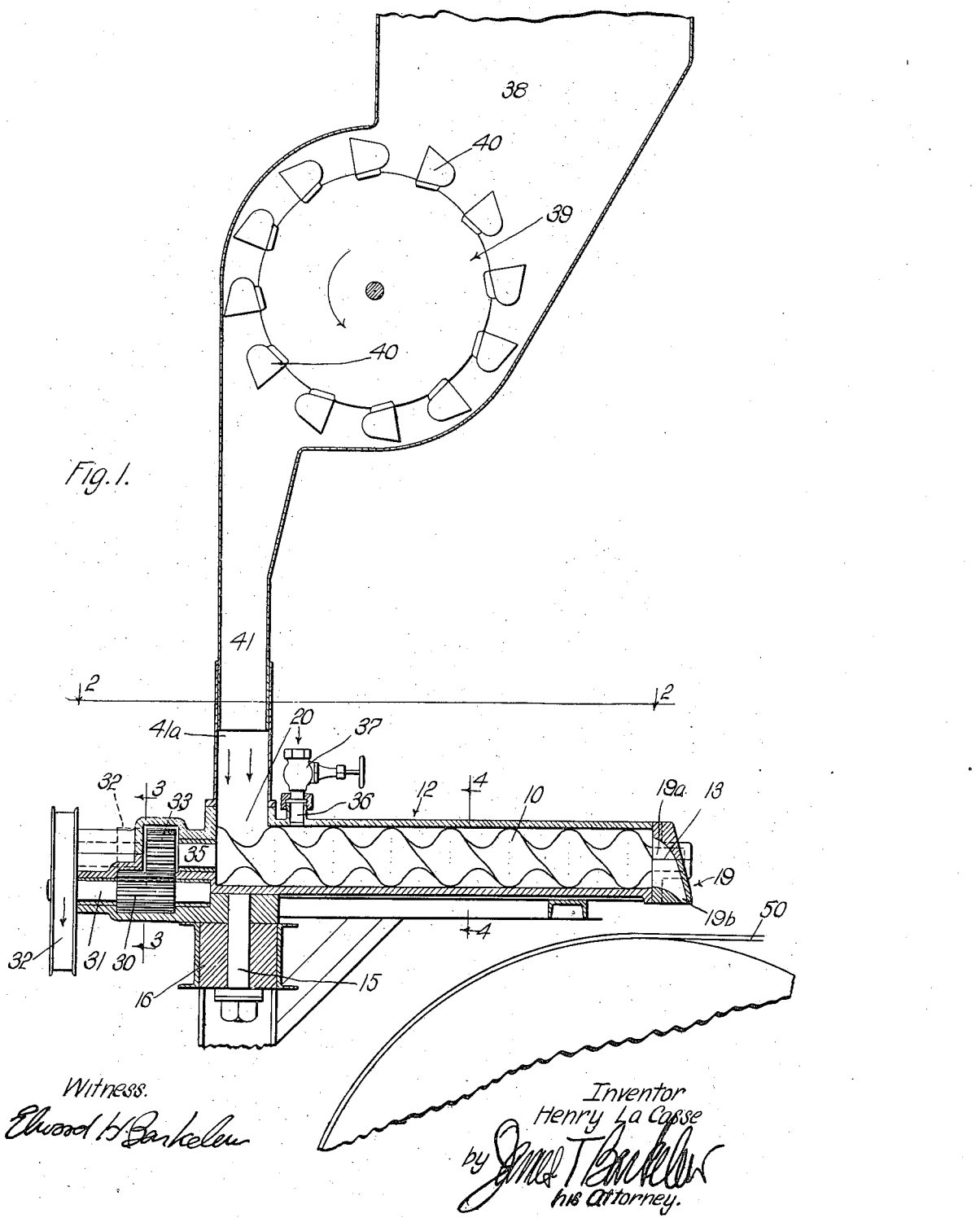

UNITED STATES PATENT OFFICE.

HENRY LA CASSE, OF LOS ANGELES, CALIFORNIA, ASSIGNOR TO BUTTONLATH MANUFACTURING COMPANY, OF LOS ANGELES, CALIFORNIA, A CORPORATION OF CALIFORNIA.

MIXING-MACHINE.

1,173,358.　　　　　Specification of Letters Patent.　　Patented Feb. 29, 1916.

Application filed May 27, 1915. Serial No. 30,832.

*To all whom it may concern:*

Be it known that I, HENRY LA CASSE, a citizen of the United States, residing at Los Angeles, in the county of Los Angeles, State of California, have invented new and useful Improvements in Mixing-Machines, of which the following is a specification.

This invention relates to mechanism for mixing any kind of materials; and it is the object hereof to provide a mixer of small dimensions which will handle a large amount of material, a mixer in which plastic material may be mixed and conveyed and formed at the discharge as desired, a mixer in which the action takes place under pressure and the mixture is forced along toward the discharge with the result that the mixture may be forced into any desired form at the discharge.

In the specific and preferred form herein described my mixing machine is adapted particularly to mixing a dry cementitious substance with water. This specific form embodies a pair or more of parallel closely and tightly fitting intermeshing screws, a means for rotating said screws so as to keep them constantly intermeshing and so as to move material from one end to the other of said screws, a means to feed material to be mixed to one end of the screws, and discharge means at the other end of the screws. There are various details of construction herein noted; and these details, and the fundamental features described, are directed particularly to the accomplishment of one of the primary objects of the invention; viz. to provide a simple device of small dimensions which will effectively handle and efficiently mix a large quantity of material.

One distinctive feature of my invention is the extremely small size of the machine for effectively handling a given tonnage, a statement of which is herein included.

For the purpose of this specification, I have shown a preferred form of my mixing machine in the accompanying drawings, in which—

Figure 1 is a vertical longitudinal section of the machine, Fig. 2 is a plan thereof taken as indicated by line 2—2 on Fig. 1, Fig. 3 is an enlarged detail section taken as indicated by line 3—3 on Fig. 1, and Fig. 4 is an enlarged section taken as indicated by line 4—4 on Fig. 1.

In the drawings I have shown a pair of intermeshing screws at 10 and 11, said screws being of about the proportional dimensions shown and being closely surrounded from end to end by a suitable casing 12, the casing being parted at 13 so that the upper half of the casing may be easily and readily removed for inspection, cleaning, etc. The two halves of the casing may be held together by suitable quick acting clamps 14 as indicated in the drawings. The lower half of the casing is preferably pivotally mounted upon the vertical pivot stud 15, which stud is mounted upon the supporting frame 16 of any suitable character; so that the whole mixer may be swung back and forth in the directions indicated. The outer end of the mixer is supported by rollers 17 running upon a circular track 18 as illustrated; and the discharge 19 of the mixer overhangs this circular track and overhangs the moving belt 50 upon which the mixed material is discharged, as hereinafter described.

Concentric with the pivot stud 15, and directly above it, I provide the inlet opening 20 for material, said inlet opening being centrally located with regard to the two screws 10 and 11, so as to discharge the material directly between the two screws into the zone of intermeshing indicated by the letter Z. By reference to Fig. 4, it will be seen that there is a considerable zone in which the two screws intermesh, indicated by the letter Z, and it will be noted that this zone extends longitudinally from end to end of the screws. The zone of intermeshing corresponds more or less substantially with the zone in which the mixing of material takes place and in which the material is moved forwardly from end to end of the screws.

The two screws are pitched in the same direction, each having preferably a double thread; and the sectional contour of each thread is made so that the peripheral portions of each screw will fit accurately into the threads of the other, so as to make a tight longitudinal line of contact between the two screws. The two screws are driven in unison in the same direction by some suitable gearing arrangement, such as is shown in Figs. 1 and 3. A driving gear is mounted upon the drive shaft 31 carrying a pulley 32, or any other suitable driving means; and gear 30 meshes with gears 32 and 33 mounted on the shafts 34 and 35, respectively, which shafts carry, respectively, the screws 10 and 11. By this arrangement the screws are rotated in unison in the same direction, in the direction indicated, which direction is such that material placed within the casing will be carried by the screws from the inlet 20 to the discharge 19.

It will be understood that the foregoing is a description of the screw mechanism in one of its specific forms. The screws may have any number of threads of any desired pitch, and the screws themselves may be of any number. If there are more than two then there is an intermeshing and mixing zone between each two adjacent screws. If the threads are single the screws may be intermeshed more deeply, making the zone Z larger and increasing the conveying capacity of the machine, thereby increasing its total capacity.

In the particular embodiment of my invention herein shown the dry cementitious material is introduced through the inlet opening 20 at one end of the casing, and at one end of the screws (the left hand end in Figs. 1 and 2) water is introduced through a suitable opening 36, controlled in some suitable manner, as by valve 37. In order to keep a proper ratio between the dry material and water, the dry material is preferably supplied from a suitable bin 38 under the control of a measuring device or feeder 39. I prefer to use a rotary feeder having measuring buckets 40 which discharge into a vertical tube 41 leading directly to the inlet 20. The lower end 41$^a$ of this tube may be slid upwardly so that the inlet may be reached for inspection, etc.; and it will be noted that the construction is such that no obstruction or shoulder is presented to the downwardly moving material. Accurate control is thus had of the dry material, and the control of water feed is accurately had by the valve 37. The reason for supplying the dry cementitious material at the end of the screws and for supplying the water near that end, but removed somewhat toward the discharge end of the screws, is this—that the dry cementitious material is given opportunity to drop down into the screws and to become subject to the forward moving action thereof before the water mingles with the cementitious substance. If the water and cementitious substance were supplied at the same opening, mixed substances might clog in the inlet opening 20 before reaching the screws.

The outlet 19 preferably comprises an outlet opening having an inner end 19$^a$ of substantially the same size and substantially co-extensive with the intermeshing zone Z; and this outlet opening has an outer end 19$^b$ spread out horizontally and of a slightly less capacity than the inner end of the opening and of slightly less capacity than the capacity of the screws; so that, when the device is in full operation, some pressure is developed upon the mixed materials being discharged at 19$^b$, causing the wide discharge opening 19$^b$ to be constantly and completely filled with the mixed material. This is particularly for the purpose of obtaining a uniform distribution of the material throughout the discharge opening and for obtaining even distribution over the receiving member below. In practice, the mixer is oscillated on its pivot to evenly distribute the material over a wide surface.

It will be seen that the shape of the discharge may be made as desired; and I explain that this shape might be made to conform to the configurations of the articles to be formed. In the specific mechanism herein illustrated the outlet is formed so as to spread and distribute the material as described. But the discharge may be made of such shape that the material is forced out in any form, such as in rectangular form for bricks, etc., or in rectangular hollow form for hollow tiles, etc. The plasticity of the material can, of course, be controlled by proper regulation of the ingredients, so that suitable stiffness may be obtained to form the material directly as desired without the use of forms or molds. This mode of procedure is seen to depend upon the provision in this mixer for mixing and conveying under pressure or force.

In operation, the screws are revolved at a suitable speed in the directions indicated and material is supplied at the inlet end in proper proportions and in proper quantities. The action of the screws on the material is complex. The material is carried forwardly mainly in the zone Z above and below the center of the screws, and is carried by each of the screws from the zone Z around in a circular transverse path. Thus, there is a constantly forwardly moving mass of material in the zone Z and the screw 10 is constantly removing material from the lower part of this zone and carrying it around in a circular motion to the upper part of the zone, while the screw 11 is constantly removing material in the same manner from the upper part of the zone and carrying it around to the lower part of the zone. The result is that, by this constant transposition of the material to and from the zone Z, the materials are intimately and uniformly mixed; and they are also constantly carried forward to the discharge end of the device. The action on the material may be described as this: that, the body of material is being constantly carried forward along a longitudinal line, while portions of said material are being constantly transposed transversely from one point of the longitudinally moving body to the other and from the other to the one. The discharge takes place through the outlet 19ª, substantially co-extensive with the zone Z. The effectiveness of the device is best shown by the fact that a pair of screws four and one half inches in diameter and thirty three inches long, revolving at about two hundred revolutions per minute, will handle approximately six thousand pounds of material per hour, and will so effectively mix that material that no lack of uniformity whatever can be detected in the mixed product.

It will be seen that my machine may be used for any operation which involves mixing, kneading, or incorporating into a thorough mixture or homogeneous mass. Thus, kneading of clay for bricks, dough for bread, as well as the mixing of such materials, can be carried out in my machine.

Having described a preferred form of my invention, I claim:

1. A mixing machine, embodying a pair of parallel intermeshing screws pitched in the same direction, the thread of each screw being of such section that the peripheral portions of the other screw fit closely into it to make a line of tight contact between the two screws, means for supplying material to the screws at one end, and means to rotate the screws in unison in one direction.

2. A mixing machine, embodying a pair of parallel intermeshing screws, the thread of each screw being of such section that the peripheral portions of the other screw fit closely into it to make a line of tight contact between the two screws, a casing surrounding the screws, and means to rotate the two screws in constant intermesh with each other.

In witness that I claim the foregoing I have hereunto subscribed my name this 21st day of May 1915.

HENRY LA CASSE.

Witnesses:
 GEO. W. JONES,
 ELWOOD H. BARKELEW.